Patented Oct. 19, 1954

2,692,268

UNITED STATES PATENT OFFICE 2,692,268

POLYCYCLIC TERTIARY AMINES

Theodore Le Sueur Cairns, Newark, and Walter W. Gilbert, Wilmington, Del., assignors to E. I. du Pont de Nemours & Company, Wilmington, Del., a corporation of Delaware No Drawing. Application November 21, 1952, Serial No. 321,936

4 Claims. (Cl. 260—315)

This invention relates to new cyclic ketone condensation products and to methods for their preparation. More particularly this invention relates to new amines and to their preparation.

It is known [Compt. rend. 169, 239 (1919)] that cyclohexanoneimine and an unidentified liquid, B. P. 183° to 184° C./3 mm. are obtained by reacting cyclohexanone with ammonia at 300°–330° C. over a dehydration catalyst.

It is an object of this invention to provide new chemical products and methods for their preparation. A further object is to provide new amines and methods for their preparation. A still further object is to provide new cyclic ketone condensation products. Another object is to provide new polycyclic amines having effective fungicidal properties. Other objects will appear hereinafter.

These and other objects of this invention are accomplished by providing new amines which are the products obtained by condensing, under pressure at a temperature below 200 C., ammonia with a cycloalkanone containing at least one methylene group alpha to the carbonyl group. These new amines conform to the general formula $C_{3(n+1)}H_{3(2n-1)}N$ wherein $n$ is a whole number corresponding to one less carbon atom than the total number of carbons in the cycloalkanone and show strong absorption bands in the infra-red in the vicinity of $6.07\mu$ and weak absorption bands in the vicinity of $2.95\mu$ and $6.35\mu$.

It has now been found that when cycloalkanones are reacted with ammonia, in the absence of a catalyst, under pressure at temperatures up to 2000° C., there are obtained in good yields mixtures of products from which new amines have been isolated conforming to the general formula $C_{3(n+1)}H_{3(2n-1)}N$ where $n$ is a whole number corresponding to one less carbon atom than the total number of carbons in the cycloalkanone. These new amines possess fungicidal properties and are therefore valuable compositions of matter.

In preparing the new amines of this invention batchwise, a pressure reactor is charged with a weighed amount of a cycloalkanone, cooled, swept with oxygen-free nitrogen, and then evacuated. If desired, a diluent such as carbon monoxide, an ether, or hydrocarbon may then be added. Ammonia is charged, and the mixture held at a temperature below 200° C. under 100–20,000 lb./sq. in. pressure for a period of time up to 24 hours. The reactor is then opened, the reactor discharged, and the contents processed to recover the desired amine from unreacted starting materials and by-products.

This invention is further illustrated in greater detail, but not limited, by the following examples:

Example I

Cyclohexanone (200 g., 2.04 m.) was loaded under nitrogen into a 1-liter stainless-steel rocker bomb. The bomb was pressure-tested with nitrogen and then cooled with Dry Ice. Liquid ammonia (100 g., 5.88 m.) was next passed into the bomb. Reaction was allowed to proceed with agitation at 100° C. under autogenous pressure for 10.5 hours. The bomb was then cooled to room temperature, the pressure released and the contents removed.

The reaction mixture, consisting of an oil layer and a water layer, was made strongly acid with hydrochloric acid and extracted with ether to remove neutral and acidic materials. The aqueous layer was then made strongly alkaline with sodium hydroxide and extracted with ether. This latter ether extract was dried over anhydrous sodium sulfate. After removal of the sodium sulfate and ether, the remaining oil was flash-distilled through a vapor bath still at temperatures up to 210° C. at 2 mm. or less pressure. The distillate was then fractionated through a 24″ spinning band column to yield the following products: 2-cyclohexylidenecyclohexanone, 35 g. (19.5% conversion of the cyclohexanone), B. P. 88° C./0.5 mm., $n_D^{25}$ 1.5060.

*Analysis.*—Calc'd for $C_{12}H_{18}O$: C, 80.9%; H, 10.18%. Found: C, 79.9; H, 10.36.

$C_{18}H_{27}N$, basic compound, 18.5 g. (10.5% conversion of cyclohexanone), B. P. 140–163° C./0.2–0.35 mm., $n_D^{25}$ 1.5620.

*Analysis.*—Calc'd for $C_{18}H_{27}N$: C, 84.0; H, 10.57; N, 5.44; N. E., 257. Found: C, 83.4; H, 10.45; N, 5.62; N. E., 264.

Example II

Cyclopentanone (171 g., 2.04 m.) was reacted with ammonia (100 g., 5.88 m.) at 100° C. under autogenous pressure for 13.3 hours and the reaction mixture worked up as described in Example I to yield the following: 2-cyclopentylidenecyclopentanone, 7.5 g. (5% conversion of cyclopentanone), B. P. 74° C./0.4 mm., $n_D^{25}$ 1.5257.

$C_{15}H_{21}N$, basic compound, 22.5 g. (15.4% conversion of cyclopentanone), B. P. 111–138° C./0.25–0.4 mm., $n_D^{25}$ 1.5466.

*Analysis.*—Calc'd for $C_{15}H_{21}N$: C, 83.7; H, 9.83; N, 6.51; N. E., 215. Found: C, 82.8; H, 9.79; N, 6.16; N. E., 236.

Example III 4-methylcyclohexanone (200 g., 1.79 m.) was reacted with ammonia (100 g., 5.88 m.) at 100° C. under autogenous pressure for 13.5 hours and the reaction mixture worked up as described in Example I to yield the following: 2-(4-methylcyclohexylidene)-4-methylcyclohexanone, 18 g. (9.8% conversion of the ketone), B. P. 97–115° C./0.35–0.55 mm., $n_D^{25}$ 1.4949.

*Analysis.*—Calc'd for $C_{14}H_{22}O$: C, 81.5; H, 10.73. Found: C, 80.6; H, 10.76.

$C_{21}H_{33}N$, basic compound, 8.3 g. (4.7% conversion of ketone), B. P. 142–157° C./0.25–0.5 mm., $n_D^{25}$ 1.5325.

*Analysis.*—Calc'd for $C_{21}H_{33}N$: C, 84.2; H, 11.10; N, 4.67; N. E., 299. Found: C, 82.6; H, 10.83; N, 4.78; N. E., 319.

Example IV 3-methylcyclohexanone (200 g., 1.79 m.) was reacted with ammonia (100 g., 5.88 m.) at 100° C. under autogenous pressure for 12.75 hours and the reaction mixture worked up as described in Example I to yield the following: 2-(3-methylcyclohexylidene)-3-(and 5)-methylcyclohexanone, 14.5 g. (8% conversion of the ketone), B. P. 102–104/1 mm., $n_D^{25}$ 1.4993.

*Analysis.*—Calc'd for $C_{14}H_{22}O$: C, 81.5; H, 10.73. Found: C, 81.6; H, 11.20.

$C_{21}H_{33}N$, basic compound, 4.5 g. (2.5% conversion of the ketone), B. P. 150–154° C./0.6 mm., $n_D^{25}$ 1.5356.

*Analysis.*—Calc'd for $C_{21}H_{33}N$; C, 84.2; H, 11.10; N, 4.67; N. E., 299. Found: C, 83.4; H, 11.18; N, 4.98; N. E., 303.

Example V

Cyclohexanone (1000 g., 10.2 m.) was reacted with ammonia (600 g., 35.2 m.) in a 2-gal. stainless-steel stirred autoclave at 100° C. and autogenous pressure (550–350 lbs./sq. in.) for 20 hours. Procedures for loading and unloading the autoclave were similar to those described in Example I.

The reaction mixture was made strongly acid with hydrochloric acid and extracted with ether. The aqueous layer was then made strongly alkaline and extracted with ether. The two ether extracts after drying over anhydrous sodium sulfate were flash-distilled through a vapor bath still and the distillate fractionated through a 24″ spinning band column. The following products were obtained. Cyclohexanone, 314 g. (31.5% of the original ketone); 2-cyclohexylidenecyclohexanone, 203.5 g. (22.4% conversion of the ketone); $C_{18}H_{27}N$, basic compound, 173.6 g. (19.3% conversion of the ketone). The infra-red spectrum of the $C_{18}H_{27}N$ compound showed a strong absorption band at $6.07\mu$ and weak absorption bands at $2.95\mu$ and $6.35\mu$.

Example VI

Cyclohexanone was reacted with ammonia as described in Example V except that the reaction was run at 125° C. and autogenous pressure (700–525 lb./sq. in.) for 14.6 hours. The reaction mixture was extracted with ether and the extract dried over anhydrous sodium sulfate. After removal of drying agent and ether from the dried extract, the remaining oil was flash-distilled and the distillate then fractionated to yield the following products: Cyclohexanone, 132 g. (13% of original ketone); 2-cyclohexylidenecyclohexanone, 91 g. (10% conversion of the ketone); $C_{18}H_{27}N$ basic compound, 483 g. (55% conversion of the ketone).

Example VII

Cyclohexanone was reacted with ammonia as described in Example V except the reaction was run at 135° C. and autogenous pressure (700–450 lb./sq. in.) for 14.5 hours. Working up the reaction mixture as described in Example VI resulted in the following products: Cyclohexanone, 180 g. (18% of the original ketone); 2-cyclohexylidenecyclohexanone, 202 g. (22% conversion of the ketone); $C_{18}H_{27}N$, basic compound, 357 g. (41% conversion of the ketone).

Example VIII

Cyclohexanone (1000 g., 10.2 m.) was reacted with ammonia (64 g., 3.74 m.) as described in Example V at 125° C. and autogenous pressure (320–275 lb./sq. in.) for 14.6 hours. Working up the reaction mixture as described in Example VI resulted in the following products: Cyclohexanone, 216 g. (22% of the original ketone); 2-cyclohexylidenecyclohexanone, 208 g. (23% conversion of the ketone); $C_{18}H_{27}N$, basic compound, 280 g. (32% conversion of the ketone). The infra-red spectrum of the $C_{18}H_{27}N$ compound showed a strong absorption band at $6.07\mu$ and weak absorption bands at $2.95\mu$ and $6.35\mu$.

Example IX

A stainless-steel autoclave was charged with 1885 g. (19.2 m.) of cyclohexanone and 1000 g. (59 m.) of anhydrous ammonia. The contents of the autoclave were stirred at 100° C. under autogenous pressure. At the end of 17 hours the excess ammonia was vented from the autoclave.

The reaction products recovered from the autoclave were a two-phase mixture containing much dissolved ammonia. The two phases were allowed to settle, and the aqueous layer was separated and discarded. The organic layer was fractionated first at atmospheric pressure to remove unreacted cyclohexanone, entrained water, and low boiling impurities. The fractionation was completed under reduced pressure to give 842 g. (51% conversion) of viscous yellow oil boiling at 147–153° C./0.2–0.5 mm., $n_D^{24}$ 1.555–1.560.

Further purification of the yellow distillate is illustrated by the following procedure. A fraction of the crude distillate weighing 220 g. was dissolved in 1500 ml. of 2 N hydrochloric acid. The aqueous solution was extracted with ether and then made basic with excess sodium hydroxide solution. The precipitated oil was isolated by extracting the alkaline solution with ether and recovering the oil from the ether solution. After careful redistillation the yellow oil had the following properties: B. P. 158–159° C./1.5 mm.; 150–152° C./0.5 mm.; $n_D^{25}$ 1.5590, $D_4^{25}$ 1.0344.

*Analysis.*—Calc'd for $C_{18}H_{27}N$: C, 83.98; H, 10.57; N, 5.44; N. E., 257, M. W. 257. Found: C, 82.29; H, 10.58; N, 5.94; 6.07 N. E., 259, 263; M. W. 280.

The infra-red spectrum of the $C_{18}H_{27}N$ compound showed a strong absorption band at $6.05\mu$ and weak absorption bands at $2.91\mu$ and $6.38\mu$.

A derivative of the amine with chloroplatinic acid was found to melt at 135–140° C.

*Analysis.*—Calc'd for $(C_{18}H_{27}N)_2 \cdot H_2PtCl_6$: C, 46.75; H, 6.10; Pt, 21.10; N, 3.03. Found: C, 46.80; H, 6.39; residue (Pt) 17.58; N, 3.66; 3.17; 3.44.

A 150 g. sample of the original cyclohexanone-ammonia condensation product, $C_{18}H_{27}N$, in 500 g. of glacial acetic acid was hydrogenated over 10 g. of platinum-on-charcoal catalyst at room temperature. The reduced acetic acid solution was filtered and made basic with sodium hydroxide. An oily layer separated and this was taken up in ether. Next the ether solution was extracted with 2 N hydrochloric acid. At this point a white solid insoluble in ether and only slightly soluble in cold water separated. This solid was collected on a filter, washed with ether and dried. It was a very stable and surprisingly insoluble hydrochloride of an amine $C_{18}H_{31}N$. On the hot stage it sublimed without melting at 320° C.

*Analysis.*—Calc'd for $C_{18}H_{31}N \cdot HCl$: C, 72.57; N, 10.83; N, 4.70; Cl, 11.90; N. E., 298. Found: C, 71.60; H, 10.79; N, 4.65; 4.91; Cl, 11.53, 11.63.

The neutral equivalent of another sample of this amine hydrochloride, prepared by precipitation from ether solution with anhydrous HCl, gave values for the neutral equivalent of 297 and 326 by potentiometric titration.

The amine hydrochloride was suspended in chloroform and shaken with 20% sodium hydroxide solution to liberate the free amine. The aqueous layer was further extracted with chloroform and ether. The combined ether and chloroform extracts were dried over anhydrous sodium sulfate and distilled to yield 97 g. of clear viscous oil. Redistillation of this oil yielded the free base, B. P. 136° C./0.6 mm., $n_D^{25}$ 1.5290; $D_4^{25}$ 1.0095.

*Analysis.*—Calc'd for $C_{18}H_{31}N$: C, 82.70; H, 11.95; N, 5.36; N. E. and M. W., 261. Found: C, 82.74; H, 11.94; N, 5.32; 5.31; N. E. 263, 260; M. W. 288, 282.

Other derivatives of this reduced amine $C_{18}H_{31}N$ are as follows: Chloroplatinate, M. P. 248–254° C. (decomposed).

*Analysis.*—Calc'd for $(C_{18}H_{31}N)_2 \cdot H_2PtCl_6$: C, 46.35; H, 6.92; Pt, 20.93; N, 3.00. Found: C, 46.75; H, 6.95; residue (Pt) 21.15; N, 3.18, 3.31.

p-Toluene sulfonate, white needles, insoluble in 5% sodium hydroxide, M. P. 235–236° C.

*Analysis.*—Calc'd for $C_{25}H_{37}NSO_2 \cdot H_2O$: C, 69.25; H, 9.07; N, 3.23; S, 7.40. Found: C, 69.11; H, 9.06; N, 3.20; 3.11; S, 6.66, 7.11.

Example X

Cyclohexanone (200 g., 2.04 m.) and ammonia (100 g., 5.88 m.) were charged into a stainless steel reactor. The reactor was vigorously shaken, while heating the contents to 100° C. for 19 hours under autogenous pressure. The reactor was allowed to cool to room temperature, the excess ammonia was vented, and the viscous yellow liquid product was fractionated. After removal of the water, fractions boiling from 24 to 158° C./0.3 to 0.8 mm. and 159 to 162° C./0.9 to 1.0 mm. were collected. A 74 gram sample of the higher boiling fraction was re-fractionated through a spinning band column as follows:

| Cut | Weight in g. | B. P., ° C./1.5 mm. | $n_D^{22}$ |
|---|---|---|---|
| 1 | 5.0 | 70–97 | 1.5300 |
| 2 | 4.5 | 97–137 | 1.5417 |
| 3 | 9.5 | 137–151 | 1.5558 |
| 4 | 9.5 | 151–158 | 1.5577 |
| 5 | 10.0 | 158–159 | 1.5590 |
| 6 | 11.5 | 159 | 1.5590 |
| 7 | 10.0 | 159–160 | 1.5590 |
| 8 | 2.0 | 150 | 1.5563 |

*Analysis (cut 6).*—Calc'd. for $C_{18}H_{27}N$: C, 83.98; H, 10.57; N, 5.44; N. E., 257. Found: C, 83.72; H, 10.61; N, 5.68; 5.44; N. E., 256, 252.

Since the reaction by which the products of this invention are formed involves liberation of at least 3 moles of water, it is advantageous to employ anhydrous ammonia. As illustrated in Example VIII, the amount of ammonia used can be as low as ⅓ molar equivalent of the cycloalkanone. In practice it is desirable to use a large excess of ammonia as it then functions not only as a reactant but also as a reaction medium. If desired, as much as 10 moles of ammonia per mole of cycloalkanone can be used, but generally there is little advantage from the use of more than 4 moles of ammonia per mole of cycloalkanone. Excess ammonia is bled from the reactor after completion of the reaction and after purification may be re-used, if desired.

The cycloalkanones used in the process of this invention are those which contain from 5 to 7 carbon atoms in the ring. These cycloalkanones may contain attached to the ring carbons alkyl substituents, preferably of 1 to 3 carbon atoms. These alkyl substituents can be on one but not on both carbons alpha to the carbonyl group, i. e., these cycloalkanones contain at least one methylene group alpha to the carbonyl group. Thus, these cycloalkanones, except for the carbonyl oxygen, are wholly hydrocarbon. Examples are cyclopentanone, methyl cyclopentanone, cyclohexanone, methyl cyclohexanone, and cycloheptanone.

The exact mechanism by which the new amines of this invention are formed is not definitely known. It is believed, however, that they are formed by reaction of 3 moles of the cycloalkanone with one mole of ammonia.

Pressure is an important variable in making the products of this invention. A convenient way for attaining the required pressure conditions is by operating in a closed system. If desired, however, pressures from external sources may be applied. Pressures up to the maximum permitted by the equipment may be employed but as a practical matter 20,000 lb./sq. in. represents the useful upper limit. As a rule pressures in the range of 100–10,000 lb./sq. in. are used and this embraces the preferred operating conditions.

The particular temperature employed in making the products of this invention is dependent, to some extent, upon the pressure conditions. As a rule temperatures below 200° C., especially 50°–150° C., are used because under these conditions the reaction takes place at a practical rate under pressures which correspond to the combined vapor pressures of the reactants.

The time of reaction depends upon the conditions selected and method of operation. In general, the time is no less than one hour or more than 24 hours, in a batch operation. In a continuous operation with low conversions per pass and with recovery and re-cycling of unreacted reactants, the time factor disappears as an important variable.

The compounds of this invention are polycyclic tertiary amines and contain the tertiary amino nitrogen in a cyclic structure. When hydrogenated they take up two moles of hydrogen and become secondary amines.

In the unreduced state these compounds show excellent fungicidal properties being effective against tomato early blight, tomato late blight and bean rust. In the reduced state, they show both fungicidal and insecticidal properties, being particularly effective as an insecticide against mites.

The use of these compounds as fungicides and insecticides is illustrated below:

Example A

The basic $C_{18}H_{27}N$ compound, as prepared in Example IX, was tested as a protective fungicide against tomato early blight, tomato late blight and bean rust. Water dispersions of the compound were prepared by mixing the formulation,

| | Parts |
|---|---|
| $C_{18}H_{27}N$ compound | 1 |
| Surface-active agent (Sorbitol monolaurate modified with ethylene oxide) | 0.05 |
| Acetone | 25 | in sufficient water to give the desired concentration. Tomato and bean plants were sprayed with the dispersion of selected concentration, air dried, and then inoculated with the test fungus by spraying with a suspension of its spores.

The plants were then stored in a humidity chamber overnight and then placed in the greenhouse until unprotected, inoculated control plants developed sufficient disease for measurement. Bean rust and tomato early blight lesions were counted and severity of wilting with tomato late blight was noted. Results were expressed as per cent disease (per cent lesions or per cent wilting based on the number of lesions or extent of wilting of the unprotected inoculated controls) at given concentrations of compound spray. The following results were obtained with the $C_{18}H_{27}N$ compound:

| Spray Conc. of $C_{18}H_{27}N$ (percent) | Percent Disease | | |
|---|---|---|---|
| | Tomato Early Blight | Tomato Late Blight | Bean Rust |
| 0.2 | 1 | 0 | 1 |
| 0.04 | 19 | 2 | 2 |
| 0.008 | 71 | 67 | 12 |

It is evident that the $C_{18}H_{27}N$ compound affords excellent protective action against the three fungi.

Example B

The basic cyclic ketone/ammonia condensation products obtained in Examples I, II, III, and IV were tested as protective fungicides against tomato early blight and late blight by the method described in Example A. The results are summarized below:

| Cyclic Ketone | Ammonia Cond. Product | Spray Conc., Percent | Percent Disease | |
|---|---|---|---|---|
| | | | Tomato Early Blight | Tomato Late Blight |
| Cyclohexanone | $C_{18}H_{27}N$ | 0.2 | 1 | 2 |
| | | 0.04 | 6 | 42 |
| 3-Methylcyclohexanone | $C_{21}H_{33}N$ | 0.2 | 0 | 5 |
| | | 0.04 | 12 | 58 |
| 4-Methylcyclohexanone | $C_{21}H_{33}N$ | 0.2 | 1 | 1 |
| | | 0.04 | 10 | 33 |
| Cyclopentanone | $C_{15}H_{21}N$ | 0.2 | | 75 |
| | | 0.04 | 33 | 92 |

It is evident that all four cyclic ketone/ammonia condensation products afford fungistatic protection against tomato early blight and late blight.

Example C

The $C_{18}H_{27}N$ compound prepared from cyclohexanone and ammonia was tested as a curative fungicide against bean rust. In this test, the bean plants were inoculated with bean rust spores, placed in a humidity chamber overnight and then put in the greenhouse to permit the spores to develop. Forty-eight hours after inoculation, the plants were sprayed with a water dispersion of the compound, placed in a humidity chamber for a few hours and then put back into the greenhouse to permit the fungus to continue developing.

Expressing the results as described in Example A, the $C_{18}H_{27}N$ compound permitted only 1.3% disease compared to the unsprayed inoculated plants with 100% disease. It is very unusual for a purely organic compound to show such curative action against fungi since such an effect is usually obtained only with highly toxic chemicals such as mercury derivatives.

Example D

The $C_{18}H_{31}N$ compound obtained by hydrogenation of the $C_{18}H_{27}N$ compound as described in Example IX was found to have activity both as a fungicide and an insecticide. As a protective fungicide against bean rust the following result was obtained:

| $C_{18}H_{31}N$ Spray Conc. (Percent) | Percent Disease Bean Rust |
|---|---|
| 0.04 | 5 |
| 0.008 | 27 |

When applied as an insecticide from acetone solution, the compound gave the following results:

| Insect | $C_{18}H_{31}N$ Spray Con. (Percent) | Percent Kill |
|---|---|---|
| Mites | 2 | 100 |
| | 1 | 100 |
| | 0.1 | 15 |
| | 0.05 | 12 |
| Aphids | 2 | 100 |
| | 1 | 0 |
| Roaches | 2 | 100 |
| | 1 | 94 |
| Houseflies | 2 | 60 |
| | 1 | 19 |

It is evident from the foregoing data that the $C_{18}H_{31}N$ compound is both an effective fungicide and insecticide.

As many apparently widely different embodiments of this invention may be made without departing from the spirit and scope thereof, it is to be understood that this invention is not limited to the specific embodiments thereof except as defined in the appended claims.

We claim:

1. An amine which is the product obtained by condensing, under pressure at a temperature below 200° C., ammonia with a cycloalkanone containing from 5 to 7 carbon atoms in the ring and at least one methylene group alpha to the carbonyl group, said amine having the general formula $C_{3(n+1)}H_{3(2n-1)}N$ wherein $n$ is a whole number corresponding to one less carbon atom than the total number of carbon atoms in said cycloalkanone and said amine being characterized by having in the infrared spectrum a strong absorption band in the vicinity of $6.07\mu$ and weak absorption bands in the vicinity of $2.95\mu$ and $6.35\mu$.

2. An amine which is the product obtained by condensing, under pressure at a temperature below 200° C., ammonia with cyclohexanone, said amine having the general formula $C_{18}H_{27}N$ and being characterized by having in the infrared spectrum a strong absorption band in the vicinity of $6.07\mu$ and weak absorption bands in the vicinity of $2.95\mu$ and $6.35\mu$.

3. An amine as set forth in claim 1 wherein said cycloalkanone is cyclopentanone and said amine has the general formula $C_{15}H_{21}N$.

4. An amine as set forth in claim 1 wherein said cycloalkanone is methylcyclohexanone and said amine has the general formula $C_{12}H_{33}N$.

No references cited.